US009098922B2

(12) United States Patent
Tico

(10) Patent No.: US 9,098,922 B2
(45) Date of Patent: Aug. 4, 2015

(54) ADAPTIVE IMAGE BLENDING OPERATIONS

(75) Inventor: Marius Tico, Mountain View, CA (US)

(73) Assignee: Apple Inc., Cupertino, CA (US)

(*) Notice: Subject to any disclaimer, the term of this patent is extended or adjusted under 35 U.S.C. 154(b) by 467 days.

(21) Appl. No.: 13/490,183

(22) Filed: Jun. 6, 2012

(65) Prior Publication Data
US 2013/0329002 A1  Dec. 12, 2013

(51) Int. Cl.
G06K 9/36 (2006.01)
H04N 7/00 (2011.01)
G06T 3/40 (2006.01)
H04N 5/232 (2006.01)

(52) U.S. Cl.
CPC .......... *G06T 3/4038* (2013.01); *H04N 5/23238* (2013.01)

(58) Field of Classification Search
CPC .......................... H04N 5/23238; G06T 3/4038
USPC .............. 348/36, 218.1, 222.1, 239; 382/284, 382/103, 154
See application file for complete search history.

(56) References Cited

U.S. PATENT DOCUMENTS

| | | | |
|---|---|---|---|
| 6,075,905 A * | 6/2000 | Herman et al. ............... | 382/284 |
| 6,094,215 A | 7/2000 | Sundahl | |
| 6,167,404 A | 12/2000 | Morcos | |
| 6,243,103 B1 | 6/2001 | Takiguchi | |
| 6,304,284 B1 | 10/2001 | Dunton | |
| 6,978,052 B2 | 12/2005 | Beged-Dov | |
| 7,006,124 B2 | 2/2006 | Peleg | |
| 7,409,105 B2 | 8/2008 | Jin | |
| 7,424,218 B2 | 9/2008 | Baudisch | |

(Continued)

FOREIGN PATENT DOCUMENTS

| | | |
|---|---|---|
| EP | 0592136 | 4/1994 |
| EP | 1940152 A2 | 12/2006 |

(Continued)

OTHER PUBLICATIONS

Xiong et al. "Fast Panorama Stitching for High-Quality Panoramic Images on Mobile Phones". IEEE Transactions on Consumer Electronics, vol. 56, No. 2, May 2010. pp. 298-306.*

(Continued)

*Primary Examiner* — Christopher S Kelley
*Assistant Examiner* — Zhihan Zhou
(74) *Attorney, Agent, or Firm* — Blank Rome LLP

(57) ABSTRACT

Special blend operations (referred to as "image seam-matching") are described that keep the pixel values in the two images being blended the same along their transition border or seam, and smoothly increases/decreases pixel values on either side of the seam through the images' transition band (an area around the seam in which image blend operations are constrained). Image seam-matching provides many of the benefits of gradient blending (e.g., the avoidance of ghosting), without the associated computational overhead. This makes image seam-matching a particularly useful approach for real-time image processing such as during the real-time generation of wide area-of-view images. In situations where image seam-matching may be inappropriate, such as when the images being blended include long objects that span an entire overlap region(s), a mechanism is described which allows the selection of either, or both, seam-matching and cross-fading blend operations in a graceful or smooth manner.

20 Claims, 13 Drawing Sheets

(56) References Cited

U.S. PATENT DOCUMENTS

| | | |
|---|---|---|
| 7,460,730 B2 | 12/2008 | Pal |
| 7,577,314 B2 | 8/2009 | Zhou |
| 7,590,335 B2 | 9/2009 | Kobayashi |
| 7,627,225 B2 | 12/2009 | Shimosato |
| 7,656,428 B2 | 2/2010 | Trutna |
| 7,656,429 B2 | 2/2010 | Larson |
| 7,746,404 B2 | 6/2010 | Deng |
| 7,796,871 B2 | 9/2010 | Park |
| 7,844,130 B2 | 11/2010 | Dong |
| 7,912,337 B2 | 3/2011 | Souchard |
| 8,121,809 B2 | 2/2012 | Mealy |
| 8,285,079 B2 | 10/2012 | Robertson |
| 8,310,522 B2 | 11/2012 | Jeong |
| 8,311,355 B2 | 11/2012 | Brunner |
| 8,379,054 B2 | 2/2013 | Katayama |
| 2002/0126913 A1 | 9/2002 | Kotake |
| 2004/0066449 A1 | 4/2004 | Givon |
| 2004/0155968 A1 | 8/2004 | Cheatle |
| 2004/0201705 A1 | 10/2004 | Lin |
| 2004/0233274 A1 | 11/2004 | Uyttendaele |
| 2005/0168593 A1 | 8/2005 | Akizuki |
| 2006/0114363 A1 | 6/2006 | Kang |
| 2006/0115181 A1 | 6/2006 | Deng |
| 2006/0215930 A1 | 9/2006 | Terui |
| 2006/0224997 A1 | 10/2006 | Wong |
| 2006/0268130 A1 | 11/2006 | Williams |
| 2006/0291747 A1 | 12/2006 | Peterson |
| 2007/0019882 A1 | 1/2007 | Tanaka |
| 2007/0025723 A1 | 2/2007 | Baudisch |
| 2007/0081081 A1 | 4/2007 | Cheng |
| 2007/0097266 A1 | 5/2007 | Souchard |
| 2007/0236513 A1 | 10/2007 | Hedenstroem |
| 2007/0237421 A1 | 10/2007 | Luo |
| 2007/0237423 A1 | 10/2007 | Tico |
| 2007/0258656 A1 | 11/2007 | Arabi |
| 2008/0056612 A1 | 3/2008 | Park |
| 2008/0309772 A1 | 12/2008 | Ikeda |
| 2009/0021576 A1 | 1/2009 | Linder |
| 2009/0058989 A1 | 3/2009 | Kim |
| 2009/0190803 A1 | 7/2009 | Neghina |
| 2009/0208062 A1 | 8/2009 | Sorek |
| 2009/0231447 A1 | 9/2009 | Paik |
| 2009/0244404 A1 | 10/2009 | Park |
| 2010/0053303 A1 | 3/2010 | Hayashi |
| 2010/0054628 A1 | 3/2010 | Levy |
| 2010/0097442 A1 | 4/2010 | Lablans |
| 2010/0141737 A1 | 6/2010 | Li |
| 2010/0165087 A1 | 7/2010 | Corso |
| 2010/0188579 A1 | 7/2010 | Friedman |
| 2010/0309336 A1 | 12/2010 | Brunner |
| 2010/0328512 A1 | 12/2010 | Davidovici |
| 2011/0043604 A1* | 2/2011 | Peleg et al. ............... 348/36 |
| 2011/0058015 A1 | 3/2011 | Moriyama |
| 2011/0110605 A1 | 5/2011 | Cheong |
| 2011/0116767 A1 | 5/2011 | Souchard |
| 2011/0129126 A1 | 6/2011 | Begeja |
| 2011/0141227 A1* | 6/2011 | Bigioi et al. ............ 348/36 |
| 2011/0141300 A1* | 6/2011 | Stec et al. ............ 348/222.1 |
| 2011/0157386 A1 | 6/2011 | Ishii |
| 2011/0216156 A1 | 9/2011 | Bigioi |
| 2011/0234750 A1 | 9/2011 | Lai |
| 2011/0267544 A1 | 11/2011 | Mei |
| 2011/0304688 A1 | 12/2011 | Ge |
| 2012/0076358 A1* | 3/2012 | Meadow et al. ............ 382/103 |
| 2012/0133639 A1 | 5/2012 | Kopf |
| 2012/0155786 A1* | 6/2012 | Zargarpour et al. ......... 382/284 |
| 2012/0169840 A1* | 7/2012 | Yamashita et al. ............ 348/36 |
| 2012/0229595 A1 | 9/2012 | Miller |
| 2012/0263397 A1* | 10/2012 | Kimura ............ 382/284 |
| 2012/0274739 A1* | 11/2012 | Li ............ 348/36 |
| 2012/0314945 A1* | 12/2012 | Cha et al. ............ 382/167 |
| 2013/0004100 A1 | 1/2013 | Putraya |
| 2013/0033568 A1 | 2/2013 | Kim |
| 2013/0063555 A1 | 3/2013 | Matsumoto |
| 2013/0236122 A1 | 9/2013 | Drouot |

FOREIGN PATENT DOCUMENTS

| | | |
|---|---|---|
| EP | 2018049 A2 | 1/2009 |
| JP | 2009290827 A | 12/2009 |
| WO | 9951027 A1 | 10/1999 |
| WO | 2004049257 A2 | 6/2004 |
| WO | 2006048875 A2 | 5/2006 |
| WO | 2009094661 | 7/2009 |
| WO | 2010025309 A1 | 3/2010 |
| WO | 2011033968 A1 | 3/2012 |

OTHER PUBLICATIONS

U.S. Appl. No. 13/109,875, filed May 17, 2011, Bhogal.
U.S. Appl. No. 13/109,878, filed May 17, 2011, Doepke.
U.S. Appl. No. 13/109,883, filed May 17, 2011, Doepke.
U.S. Appl. No. 13/109,889, filed May 17, 2011, Doepke.
U.S. Appl. No. 13/109,941, filed May 17, 2011, Doepke.
U.S. Appl. No. 13/151,149, filed Jun. 1, 2011, Doepke.
U.S. Appl. No. 13/489,950, filed Jun. 6, 2012, Tico.
U.S. Appl. No. 13/490,183, filed Jun. 6, 2012, Tico.
U.S. Appl. No. 13/911,243, filed Jun. 6, 2013, Doepke.
'Panoramic Image Projections', http://www.cambridgeincolour. com/tutorials/image-projections.htm, 9 pages, May 12, 2011.
'Photo Stitching Digital Panoramas', http://www.cambridgeincolour.com/tutorials/digital-panoramas.htm, 11 pages, May 12, 2011.
'Using Photo Stitching Software', http://www.cambridgeincolour.com/tutorials/photo-stitching-software.htm, 9 pages, May 12, 2011.
International Search Report and Search Opinion for PCT Application No. PCT/US2012/033010, Dated Jun. 19, 2012, 9 pages.
Joshi, Neei, et al., 'Image Deblurring using Inertial Measurement Sensors', ACM SIGGRAPH, New York, NY, 8 pages, Jul. 2010.
PCT Search Report and Search Opinion for PCT Application No. PCT/US2012/034625, dated Jul. 31, 2012, 10 pages.
"Method of Adaptive Image Blending and Artifacts Masking for Panorama Creation." Apple Inc. Camera Algorithm Team, Technical Report TR-2012-001.
"Rendering by Manifold Hopping." Submitted to Siggraph '2001, Paper No. 194, Catgory: research. pp. 1-10.
Cha, Joon-Hyuk, et al., "Seamless and Fast Panoramic Image Stitching," 2012 IEEE International Conference on Consumer Electronics (ICCE), pp. 29-30.
Efros, Alexei. "Image Blending and Compositing." Computational Photography, CMU, Fall 2010. pp. 1-82.
Levin, Anat, Assaf Zomet, Shmuel Peleg and Yair Weiss. "Seamless Image Stitching in the Gradient Domain." Proc. of the European Conference on Computer Vision (ECCV). Prague. May 2004. pp. 1-12.
McCann, James, Nancy S. Pollard. "Real-Time Gradient-Domain Painting." Computer Science Department, http://repository.cmu.edu/compsci/1257.
Perez, P., Gangnet, M., and Blake, A., 'Poisson Image Editing,' ACM Transactions on Graphics (TOG) Proceedings of ACM SIGGRAPH 2003, vol. 22, iss. 3, pp. 313-318, Jul. 2003.
Yingen Xiong and Kari Pulli, "Fast Panorama Stitching for High-Quality Panoramic Images on Mobile Phones," IEEE Transactions on Consumer Electronics, vol. 56, pp. 298-306 (2010).

* cited by examiner

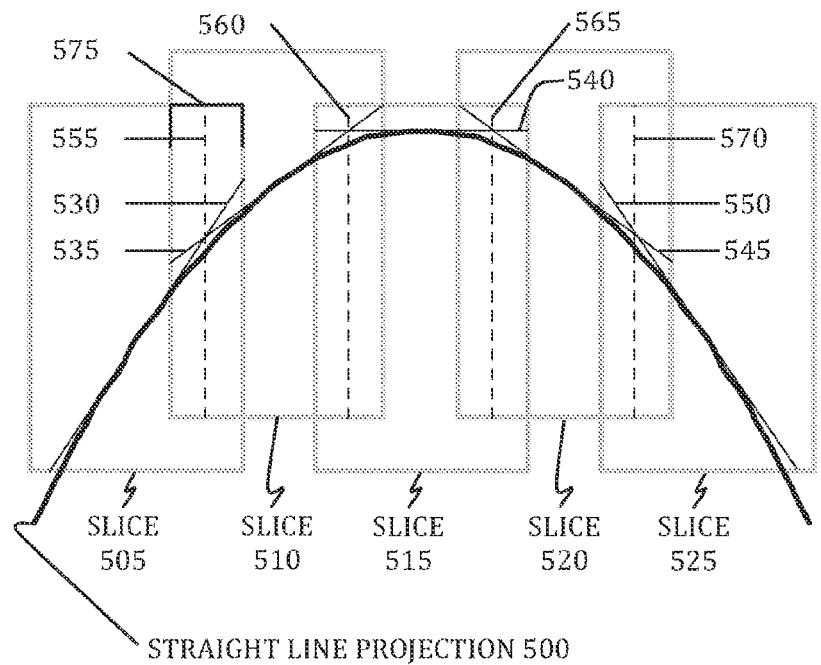
FIG. 5
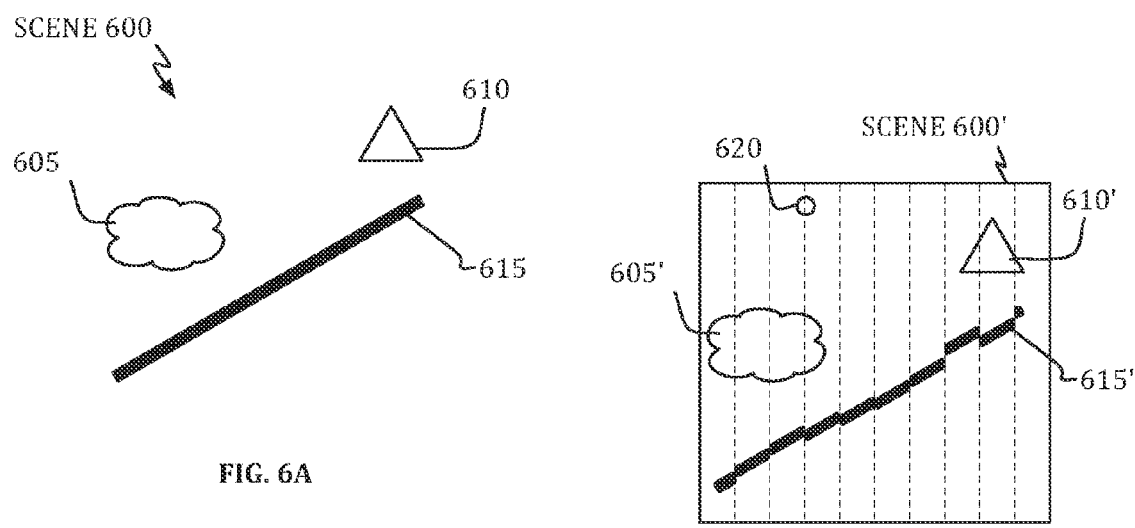
FIG. 6A
FIG. 6B

ADAPTIVE IMAGE BLENDING OPERATIONS

BACKGROUND

This disclosure relates generally to the field of image processing and, more particularly, to various blending techniques for use in generating wide area-of-view images.

One conventional method to generate a wide area-of-view image from a sequence of images (frames) is illustrated in FIG. 1. To begin, a sequence of frames is captured (block 100); frames 1 through 3. The frames are then registered (block 105), identifying the regions of overlap between successive frames (region 110 between frames 1 and 2, and region 115 between frames 2 and 3). Once regions 110 and 115 have been specified, a path or seam is identified through each region (block 120). Here, seam 125 through region 110 and seam 130 through region 115. In accordance with standard scene-cut algorithms, seams 125 and 130 are generally selected to pass through the most similar pixels between each image found in their respective overlap region (i.e., frames 1 and 2 in region 125 and frames 2 and 3 in region 130). As a result, seams 125 and 130 are typically placed outside of, but immediately adjacent to, moving objects within the respective overlap region. With seams 125 and 130 identified, a blend operation across each is performed (block 135); the result of which is final wide area-of-view image 140.

The role of blending operation 135 is to mask or obfuscate the differences or transition between two frames. One standard approach to do this uses a process known as "gradient domain" blending and consists of constructing the gradient field of final image 140 by copying the gradient fields of each image on the corresponding sides of the identified seam (e.g., referring to identifier 145, the gradient fields across seam 125 would be gradient field A from frame 1 and gradient field B from frame 2). Once this is done, the final image is generated by integrating over the gradients across the seam. Reconstructing a final wide angle-of-view image from its gradient fields requires substantial computational resources (to solve Poisson partial differential equations); resources that do not permit the real-time generation of wide angle-of-view images on common hand-held devices such as, for example, personal electronic devices having embedded image sensors such as mobile telephones, personal music players, tablet computer systems, and personal gaming devices. Gradient domain blending is also unable to mask registration errors visible along objects that span multiple frames.

Another approach, referred to as "image cross-fading," masks the transition between two frames by cross-fading pixel values from each frame along the transition seam (e.g., 125 and 130). This generally consists of calculating a weighted average between the corresponding pixel values in the two frames, where the weight given to each pixel decreases smoothly while approaching the seam and vanishes at some distance after passing the seam. For example, the weight given each pixel from frame 1 in region 110 can decrease smoothly from 1 to 0 while crossing seam 125 from left to right. Similarly, the weight given each pixel from frame 2 in region 110 can decrease smoothly from 1 to 0 while crossing seam 125 from right to left. Exactly on seam 125, pixels from both frame 1 and frame 2 will have the same weight, 0.5. Reconstructing a final wide angle-of-view image using image cross-fading techniques can result in both ghosting (manifested by preserving parts of a moving object that is close to a transition seam) and banding artifacts (manifested in smooth areas in the images such as sky, constant color walls and fine textures).

SUMMARY

In one embodiment the inventive concept provides a method to blend two images in an operation referred to as "image seam-matching." The method includes obtaining first and second images (or image slices) and identifying an overlap region between the two, where the overlap region has identified therein a seam and guard-band borders demarcating a transition band. For each seam pixel, a value may be determined based, at least in part, on the corresponding pixels from the first and second images. In one embodiment, initial seam values may be filtered to mitigate the effect of noise. For each row of pixels in the overlap region that are also within the transition band, smoothing functions may be defined. One smoothing function may be applied to those pixels in the first image that are to one side of the row's seam pixel and another smoothing function may be applied to those pixels in the second image that are to the other side of the row's seam pixel. In general, these functions may be selected to smoothly change their respective image's pixels in a manner that smoothly increases/decreases pixel values on either side of the seam through the images' transition band. In another embodiment, image seam-matching may be used in conjunction with other blending operations such as, for example, cross-fading operations. In one embodiment, each row of pixels in the overlap region may have both seam-matching and cross-fading operations applied to them, with the output of the blending operation being the weighted sum of the two approaches. The weighting may be based on a number of factors including, but not limited to, the image's content within the transition band (e.g., whether moving objects exist or whether there are long contiguous objects passing thought the overlap region. In other embodiments, the methods described herein may be implemented via computer executable program code. In still other embodiments the disclosed methods may be implemented in electronic devices having image capture capabilities.

BRIEF DESCRIPTION OF THE DRAWINGS

FIG. 5 illustrates, in one embodiment, the cylindrical projection of a continuous horizontal line in the scene.

FIGS. 6A and 6B illustrate how a continuous line in a scene may be represented as an interrupted or disjoint line in the final image.

DETAILED DESCRIPTION

This disclosure pertains to systems, methods, and computer readable media for blending images in an operation referred to as "image seam-matching." Image seam-matching seeks to make the pixel values in the two images being blended equal along their transition border or seam, and smoothly increases/decreases pixel values on either side of the seam through the images' transition band. Image seam-matching provides many of the benefits of gradient blending including the avoidance of ghosting and banding artifacts, without the associated computational overhead. This makes image seam-matching a particularly useful approach for real-time image processing such as during the real-time generation of wide area-of-view images. In those situations in which image seam-matching is inappropriate, such as when the images being blended include long objects that span an entire overlap region(s), a mechanism is described which allows the selection of either, or both, seam-matching and cross-fading blend operations in a graceful or smooth manner.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Figure 1:
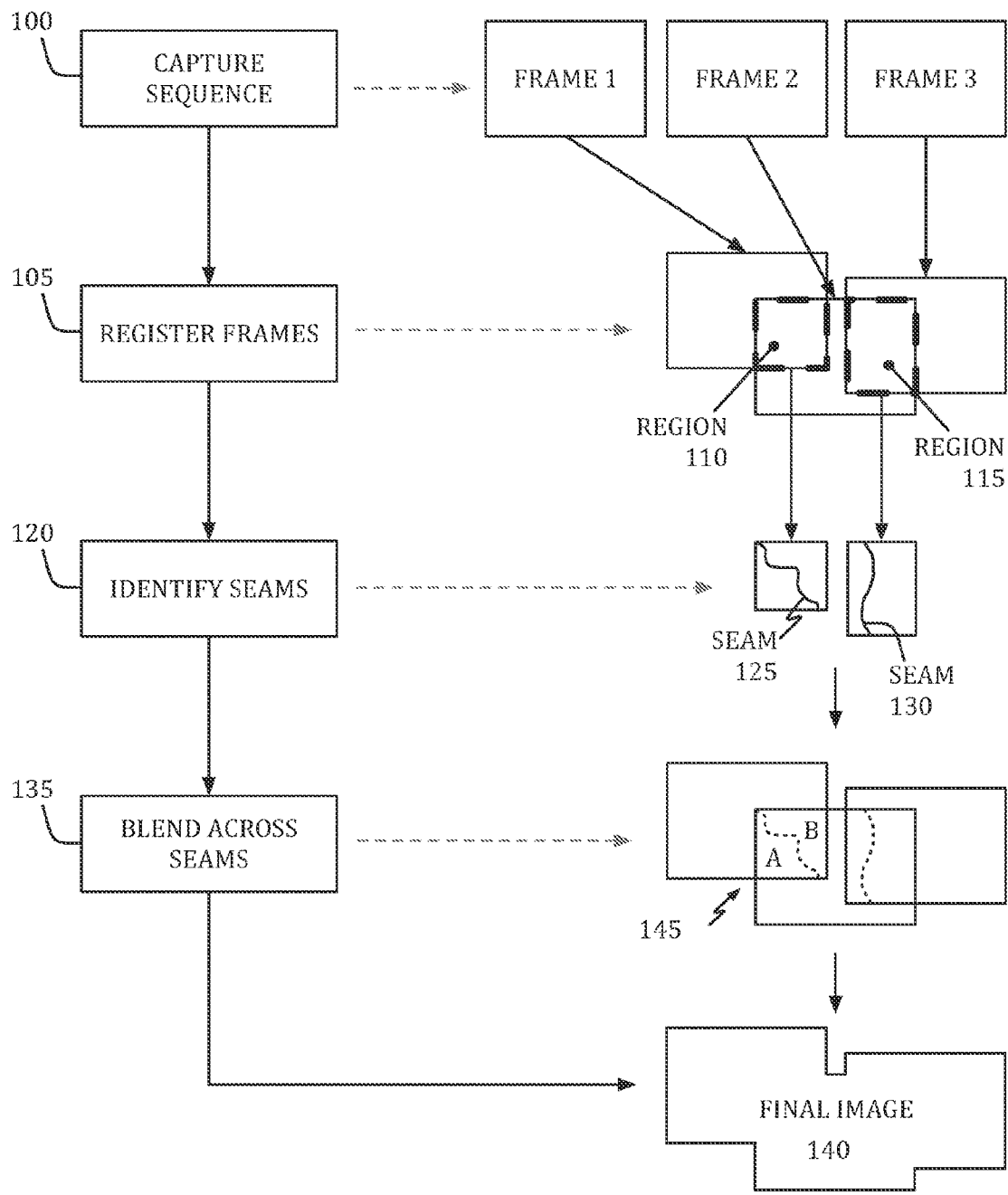
FIG. 1 shows, in flowchart and block diagram form, a wide area-of-view image generation operation in accordance with the prior art.
Figure 2:
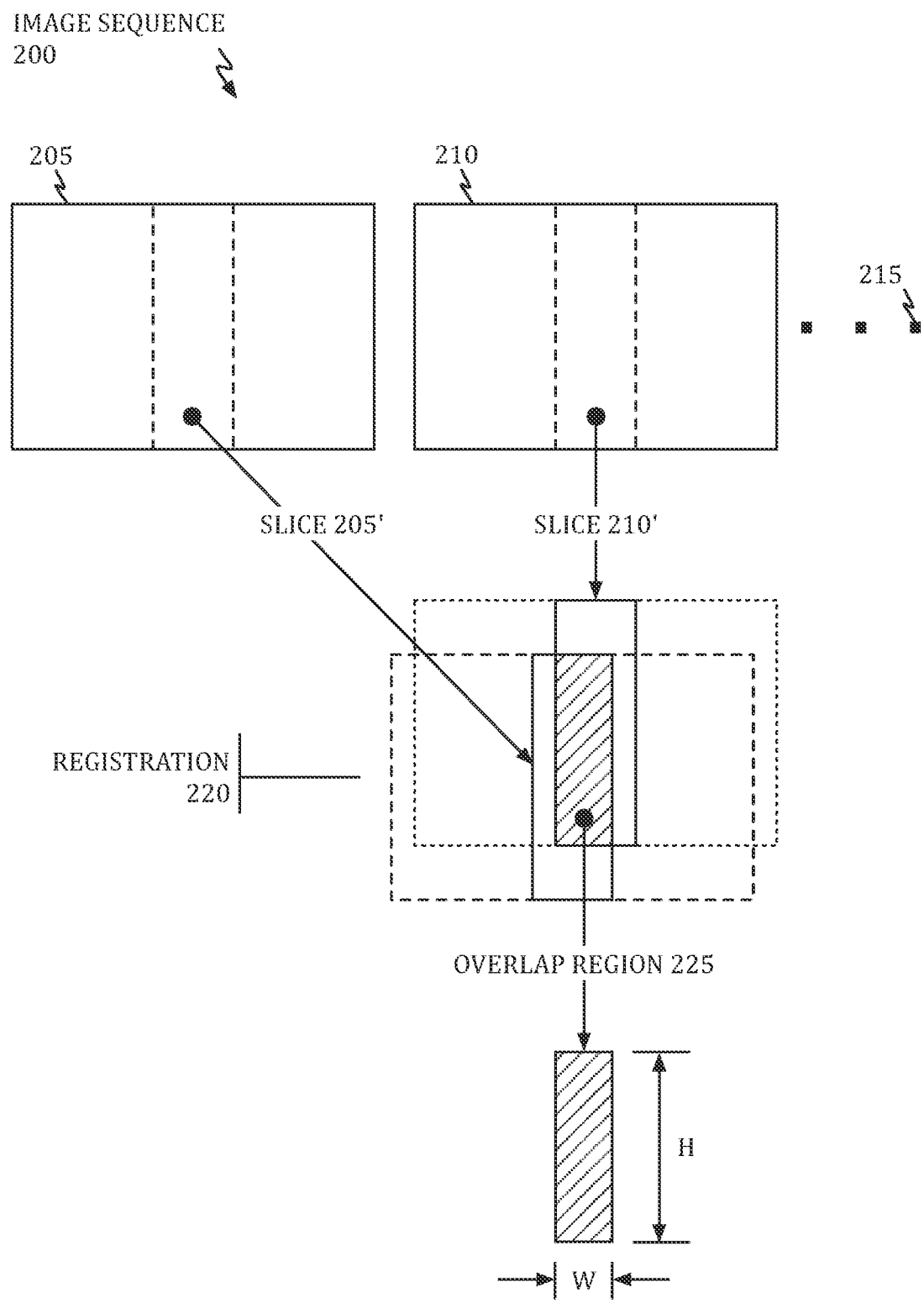
FIG. 2 shows, in block diagram form, identification of an overlap region in accordance with one embodiment.

Referring to FIG. 2, image sequence 200 includes full-size frame 205, full-size frame 210, and zero or more additional frames (designated by ellipse 215). In one embodiment, thin strips may be identified in each frame (e.g., slices 205' and 210') and used during registration operation 220 (which may include, for example, rotation, scaling, translation, affine and fully projective operations, or combinations thereof). As part of registration operation 220, overlap region 225 may be identified. To simplify the following, it is assumed that overlap region 225 is a rectangular area having a height of H pixels and a width of W pixels. Full size frames 205-215 may be substantially any size. For example, an implementation for image capture devices providing 5 Mpix full-size images (having a width of 1956 pixels and a height of 2592 pixels), may use a slice that is 240-by-2592 pixels. In like fashion, implementations using a 2 Mpix image capture device (providing images having a width of 1200 pixels and a height of 1600 pixels), may use a slice that is 200-by-1600 pixels.

It will be understood that when generating wide area-of-view images, the surrounding scene may be captured as it would be projected onto an imaginary cylindrical manifold. As such, the individual frames forming the wide area-of-view image must be projected onto this cylindrical manifold before being blended into the final image. Thus, while the precise dimensions of a slice are unimportant (e.g., 205' or 210'), in some embodiments it may be significant that the slice is much larger in one dimension (e.g., height) than it is in the other dimension (e.g., width). In embodiments in which this holds, the slices may be concatenated to approximate the cylindrical projection of the captured frames. By doing this, cylindrical warping operations may be avoided (a computationally intensive process necessary to compensate for image distortions when large slices or whole frames are registered in accordance with the prior art).

Figure 3:
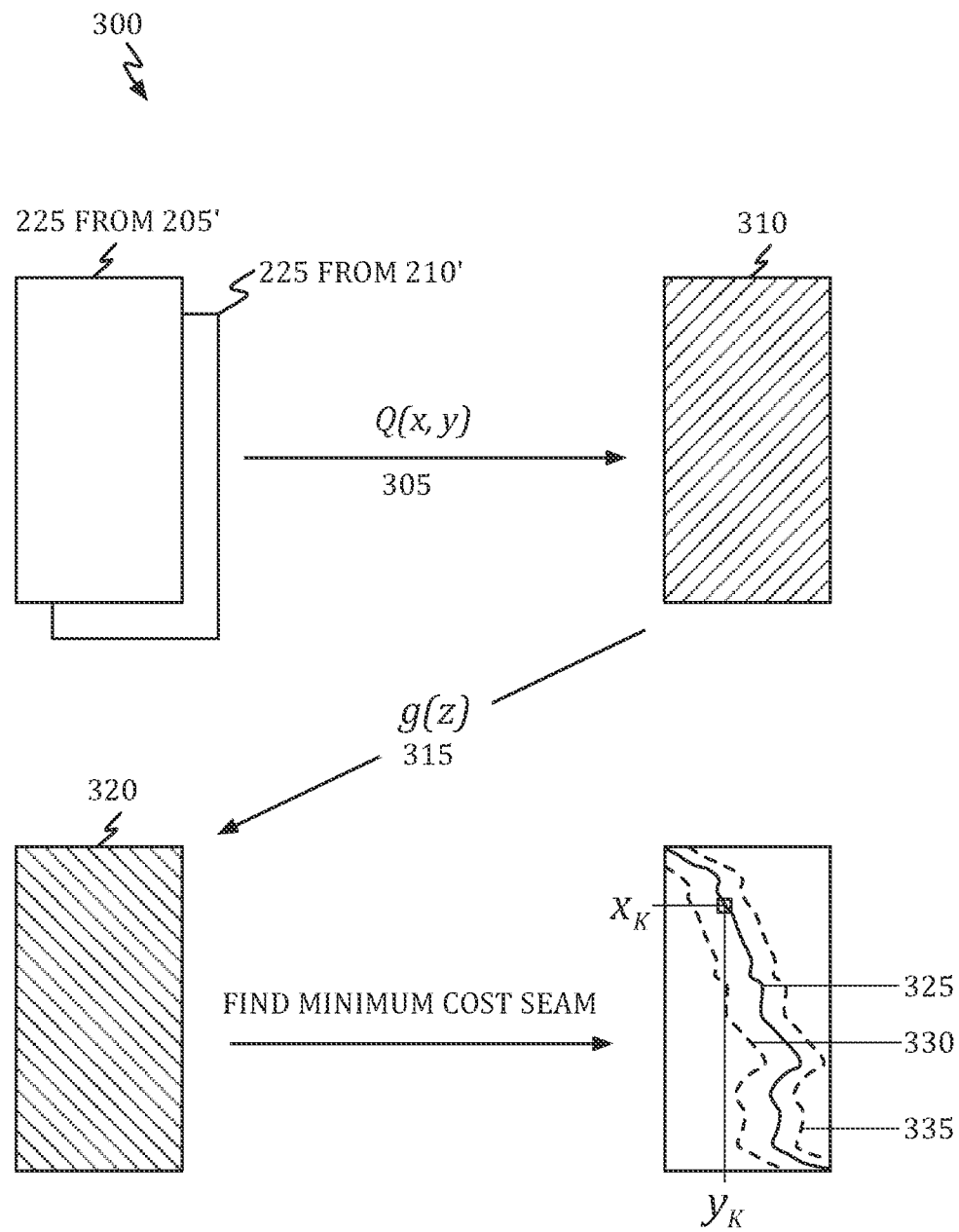
FIG. 3 shows, symbolically, a blend operation in accordance with one embodiment.

Referring to FIG. 3, blend operation 300 in accordance with one embodiment obtains the overlap regions' pixel values for each of the slices that have been registered —205' and 210'. In one embodiment, the values may be luminance values. In another embodiment, the values may represent chroma values (e.g., CbCr or RGB). A cost value $Q(x, y)$ 305 may be assigned to every pixel $(x, y)$ in overlap region 225, where $x \in \{0, 1, 2, \ldots W-1\}$ and $y \in \{0, 1, 2, \ldots H-1\}$. Cost value $Q(x, y)$ may be thought of as expressing the penalty incurred by the seam passing through that pixel. For instance, $Q(x, y)$ may represent the difference between the color values of the two overlapping pixels in the two slices (on a component-by-component basis or as a combined vector descriptor). Cost $Q(x, y)$ may also represent the absolute difference in the luminance values of the two overlapping pixels in the two slices. While the specific measure $Q(x, y)$ used may vary from one implementation to another, it is generally true that the larger the value of $Q(x, y)$, the more likely the pixels in each slice corresponding to the overlap element at $(x, y)$ are associated with different objects, and hence the seam should not pass through that pixel.

When applied to each corresponding pair of pixels (e.g., pixel 'a' in overlap region 225 from slice 205' and the corresponding pixel from slice 210'), the result may be cost map 310. Cost map 310 may be filtered via function $g(z)$ 315 to produce filtered cost map 320. In general, filter $g(z)$ 315 may be used to perturb an otherwise standard path (using, for example, scene-cut techniques) through overlap region 225 so as to introduce a guard-band. More specifically, filter $g(z)$ 315 may be used to place a higher cost on pixels that are close to an object. This has the effect of "pushing the seam away from objects" within overlap region 225. In practice, each of cost function $Q(x, y)$ 305 and filter $g(z)$ 315 may be normalized. That is, the sum of their coefficients may be adjusted to equal one (1).

Figure 4A:
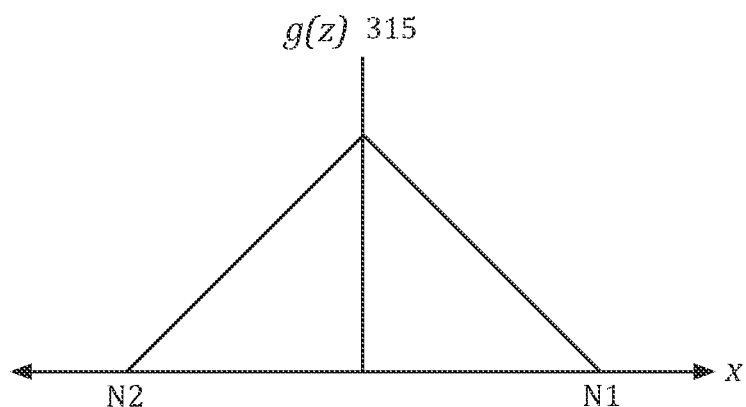
FIGS. 4A-4C show guard-band filter functions in accordance with various embodiments.
Figure 4B:
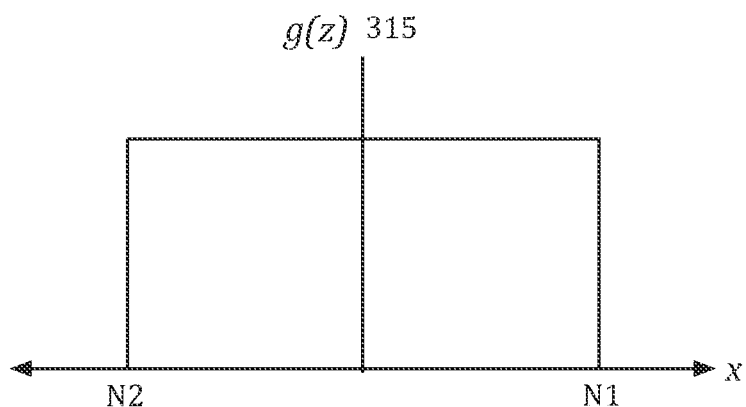
Figure 4C:
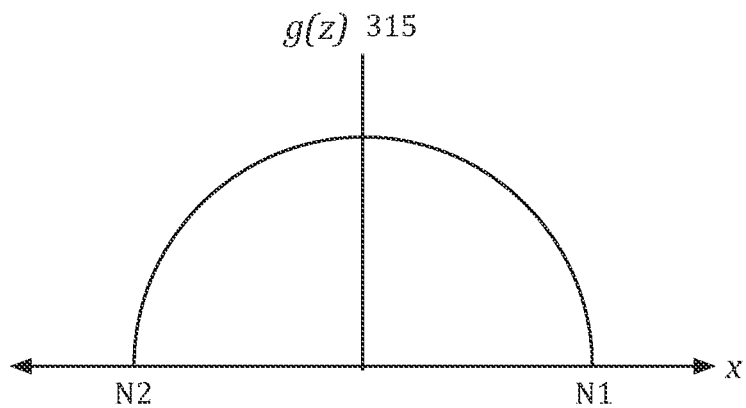

By way of example, and not limitation, FIGS. 4A-4C illustrate various filters $g(z)$ 315 that may be used in generating filtered cost map 320. While the precise shape of filter $g(z)$ is relatively unimportant, the values N1 and N2 represent the width of the applied guard-band. In an embodiment based on 5 Mpix images, a guard-band between 32 and 64 pixels has been found useful. It is noted that while values N1 and N2 have been illustrated as symmetric about a central axis in FIGS. 4A-4C, this is not necessary. Depending upon the needs of a particular implementation, a guard-band may be asymmetric about a central seam.

Once modified cost map 320 has been determined, a minimum cost for a path or seam that traverses overlap region 225 from top to bottom may be determined as follows:

$$Cost = \min\left(\sum_{k=0}^{K-1} Q(x_k, y_k)\right), \quad \text{EQ. 1}$$

where $(x_k, y_k)$ represents the coordinates of the k-th seam pixel, and K represents the number of pixels in the seam. Resulting seam 325 represents a path through overlap region 225. Application of filter g(z) 315 acts to create guard-band boundaries 330 and 335.

To ensure a continuous or near continuous seam, the number of pixels seam 325 may skip between two consecutive points may be limited to some specified value. For example, assuming that at row $x_k$ seam 325 passes through the point $(x_k, y_k)$, in the next row (row $x_{k+1}$), it may be restricted so that it may only pass through one of the points:

$$((x_{k+1}, y_k-L), (x_{k-1}, y_k-L+1), \square (x_{k+1}, y_k+L)), \quad \text{EQ. 2}$$

where L represents the maximum permitted discontinuity between consecutive pixels along seam 325. L may typically take on some small number such as, for example, 1, 2, 3, . . .

When both a minimum cost and continuity constraints are placed on finding seam 325, the cost of seam 325 up to the k-th point may be given by:

$$Cost_k = \min_{i \in [-L \ldots L]} \{C_{k+1} + Q(x_k, y_{k-1} + i)\}. \quad \text{EQ. 3}$$

With both the minimum cost seam (e.g., seam 325) and guard-band boundaries known (e.g., boundaries 330 and 335), each pixel from slice 205' and its corresponding pixel in slice 210' that are along a row in overlap region 225 and between guard-band boundaries 330 and 335 may be blended on a pixel-by-pixel basis. Illustrative blending operations include, but are not limited to, alpha blending, dissolve blending, multiply and screen type blending, dodge and burn type blending, arithmetic blending, Boolean blending, and hue, saturation and luminosity blending. These blends may be performed in real-time (no gradient reconstruction is required).

In summary, the embodiments disclosed above register and blend images using regions defined by overlapping thin strips (aka slices) extracted from each frame. It is further noted that various embodiments of blend operation 300 may be performed in real-time. These results are both novel and unexpected, especially since it has been recognized in the field of image processing that optimal seam selection algorithms are not generally appropriate when thin strips are taken from the input images as in the case of blend operation 300. (See A. Levin, A. Zomet, S. Peleg, and Y. Weiss, *Seamless Image Stitching in the Gradient Domain*, Proc. of the European Conference on Computer Vision (ECCV), Prague, May 2004.)

Because some embodiments use only thin slices from each frame, it is highly likely that objects in the scene will span multiple slices. In particular, long, straight objects such as wires, bars and the like may span tens of slices (or more). Maintaining the continuity of these types of objects in the final image is important for providing high quality results. The very use of thin slices, however, make this difficult.

Referring to FIG. 5, in the case of a perfect cylindrical projection, a contiguous horizontal line from a scene becomes curve 500 in the final image. As shown, each slice 505-525 represents its own part of curve 500 as a straight line (e.g., 530-550). The mismatch between each slice's straight line approximation and the corresponding continuous projection 500 can cause the final image to display the line as a discontinuous series of line segments. For the case where a single continuous horizontal line from the scene is captured for a wide area-of-view image, dashed lines 555-570 represent the "best" seams since they maintain continuity between the individual line segments making up the cylindrical projection of continuous curve 500. Selecting any different seam position will result in a representation where the continuous line in the scene is presented in the final image as an interrupted line. This recognition would seem to suggest that a correct cylindrical approximation may be obtained by always selecting the best vertical seam between two consecutive slices (frames). This approach fails to consider, however, the fact that a scene may contain lines at any orientation, and that always selecting a vertical line (e.g., 555) through an overlap region (e.g., 575) may result in the seam passing through a moving object.

As previously discussed, seams that pass through, or are placed immediately adjacent to, a moving object can result in ghosting artifacts in the final image. Scene-cut approaches attempt to avoid this problem by selecting seams that are continuous paths and which go around moving objects and other areas where the two images are different. One novel embodiment of this approach is described above (e.g., see FIG. 3 and related discussion). Scene-cut is generally applied only to input images or slices after they have been warped to the final projective manifold (e.g., a cylindrical manifold). If the input slices are not so warped, approximation of a cylindrical projection through narrow planar slices can be damaged because the identified seams are based solely on scene content without any consideration being given to achieving a correct cylindrical projection. In other words, by directly applying conventional scene-cut techniques, a line in the scene may become an interrupted line in the final image.

Referring to FIG. 6A, scene 600 may consist of objects 605, 610 and line 615. Referring to FIG. 6B, representation of scene 600 in final wide area-of-view image 600' has elements 605' and 610' corresponding to and representing objects 605 and 610. Line representation 615' shows discontinuities at slice boundaries (illustrated by light vertical dotted lines 620) that may result from ill-advised seam selection as discussed above.

In one embodiment, these difficulties may be tempered by selecting a seam based on both the image content (e.g., in accordance with FIG. 3) and the need to achieve a good cylindrical approximation. The approach described here will be referred to as a "Biased Scene-Cut" technique. In describing the Biased Scene-Cut approach, the notation introduced in FIGS. 2 and 3 and EQS. 1-3 is adopted here. It is noted that, in one embodiment, filter g(z) 315 may be a unity function. That is, filter g(z) 315 may leave cost map 310 unchanged.

Given a pixel (x, y) in overlap region 225, let $(x^1, y^1)$ represent the coordinates of that pixel in first image $I_1$, and $(x^2, y^2)$ represent the coordinates of the corresponding pixel in second image $I_2$. In one embodiment, Biased Seam-Cut cost function $Q_b(x, y)$ may then be represented as:

$$Q_b(x,y) = B(x) \times h(I_1(x^1,y^1), I_2(x^2,y^2)), \quad \text{EQ. 4}$$

where $h(I_1, I_2)$ may represent a distance measure between pixel values, and $B(x)$ represents a function that biases the shape of the cost function $Q_b(x, y)$ toward a minimum value along a vertical axis passing through the middle of the overlap region (e.g., region 225). As illustrated in FIG. 5, this tends to preserve the quality of the final image's cylindrical projection and an improved representation therein of continuous lines. In one embodiment, distance function $h(\ )$ could be a Euclidean distance between the colors of the two overlapping pixels, $(x^1, y^1)$ and $(x^2, y^2)$. In another embodiment, function $h(\ )$ could be the absolute difference (or difference squared) between the luminance of pixel $(x^1, y^1)$ and the luminance of pixel $(x^2, y^2)$.

In one embodiment, function $B(x)$ can be:

$$B(x) = 0.1 + \left(x - \frac{W}{2}\right)^2, \text{ for } x \in 0 \square \; W - 1. \quad \text{EQ. 5}$$

Figure 7A:
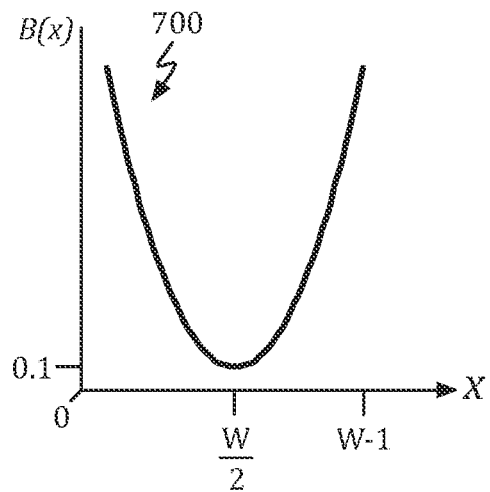
FIGS. 7A and 7B illustrate a cost bias function in accordance with one embodiment.
Figure 7B:
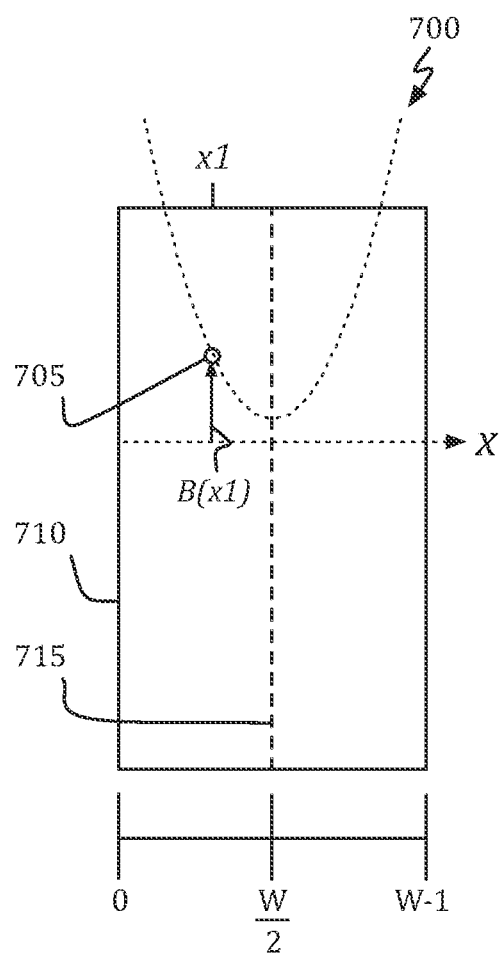

Referring to FIG. 7A, it can be seen that $B(x)$ 700 adds the least amount of cost (0.1 in accordance with EQ. 5) when the pixels being evaluated lie on the overlap region's centerline (i.e., at a location W/2). As the pixels move away from the centerline, the cost increases. This is illustrated in FIG. 7B, which shows cost bias function $B(x)$ 700 applied to pixel location 705 (at position x1) being assigned a value $B(x1)$. As can be seen, this cost may increase significantly the further the location x1 is from overlap region 710's centerline 715.

Accordingly, when overlapping pixels are similar in accordance with function $h(\ )$—meaning that function $h(\ )$ returns a small value which, in turn, means there is no moving object present—function $B(x)$ can significantly push up the overall cost the further the overlapping pixels are from the overlap region's centerline. This makes it more likely that the minimum cost seam through the location being evaluated is toward the centerline (where $B(\ )$ contributes less). It should be recognized that while function $B(x)$ has been discussed in terms of quadratic function 700, this form is not necessary. Substantially any functional relationship may be used including, but not limited to, linear, exponential, and spines. In general, any function that introduces more cost the further the selected location is from the overlap region's centerline may be useful.

Figure 8:
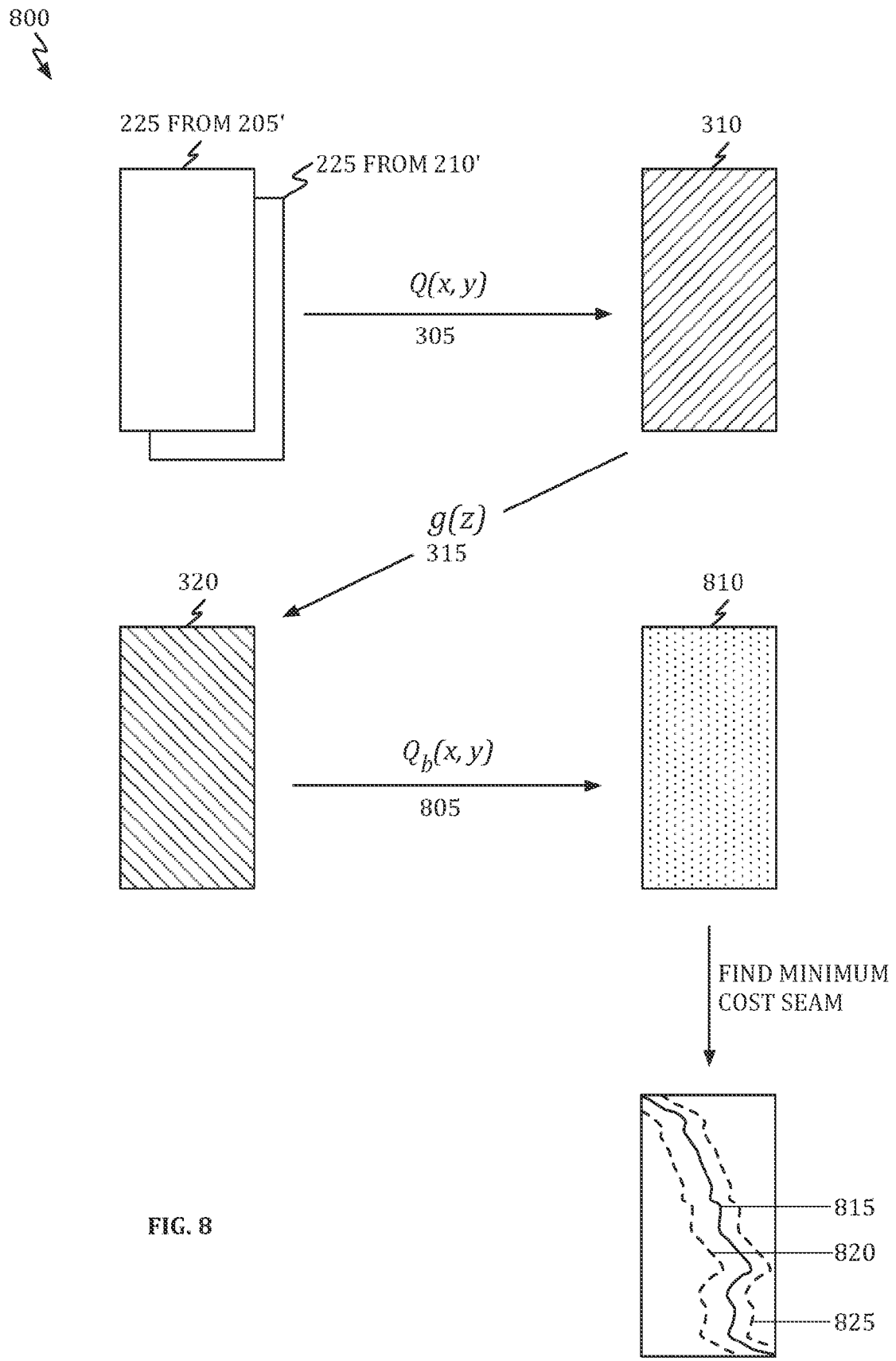
FIG. 8 shows, symbolically, a blend operation in accordance with another embodiment.

Referring to FIG. 8, blend operation 800 in accordance with EQS. 1-5 is shown schematically. In illustrated operation 800, action 305, and 315 may be used to generate modified cost map 320. Biased Seam-Cut cost function $Q_b(x, y)$ 805 may be applied to generate final cost map 810 which may then be interrogated to identify minimum cost seam 815. If filter $g(z)$ 315 is not the unity function, guard-band boundaries 820 and 825 may also be defined. As was the case with cost function $Q(x, y)$ 305 and filter $g(z)$ 315, Biased Seam-Cut cost function $Q_b(x, y)$ 805 (essentially a filter) may be normalized.

In another embodiment, blending operations employing either or both approaches described above may be used in conjunction with a registration quality measure. In one such embodiment, when overlap region 225 is identified a metric indicating the quality of the registration that yielded the overlap may be obtained. If this metric indicates the registration is "good enough" (e.g., the metric is above a specified threshold), operation 300 may proceed. If the metric indicates the registration is not good enough, visual blending operations may not return quality blending results. In this case, device sensor output may be used to estimate the device's translation. This information may then be used to register the two images and identify the overlap region. Because of the uncertainty introduced by the use of sensor output, it has been found that operations 300 ad 800 do not necessarily return better results than an alpha-blend. In one embodiment an alpha-blend may be applied across the entire overlap region. In another embodiment, an alpha-blend may be applied in the neighborhood of a vertical seam passing through the overlap region's centerline.

Figure 9:
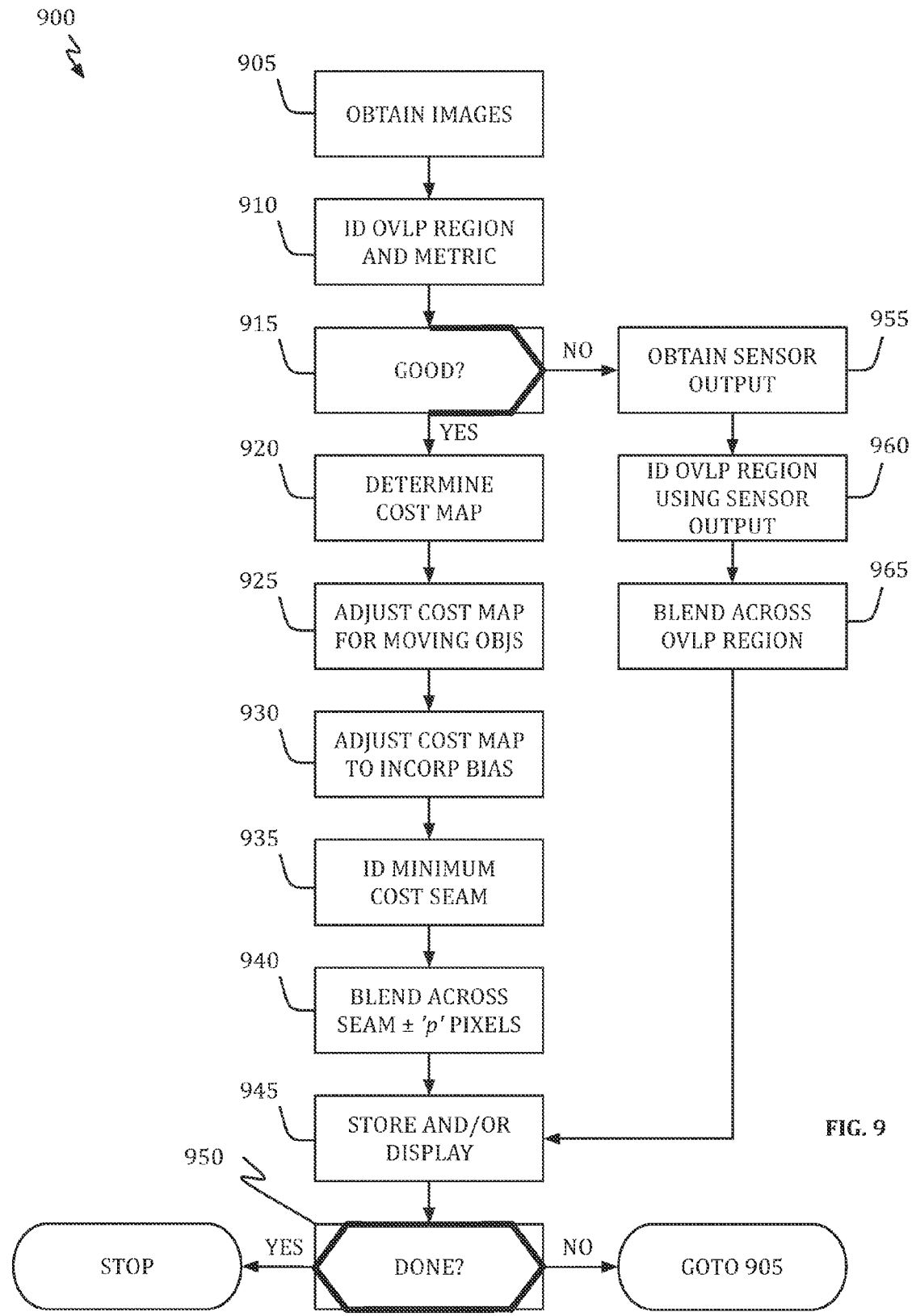
FIG. 9 shows, in flowchart form, a blend operation in accordance with yet another embodiment.

Combining some of the various embodiments described herein, and referring to FIG. 9, registration and blending operation 900 begins when two images are obtained (block 905). In one embodiment, images may be obtained directly from an image capture device or sensor. In another embodiment, images may be obtained from a secondary source (e.g., storage). The two images may be registered to identify an overlap region and a quality metric (block 910). If the quality metric indicates the registration is acceptable (the "YES" prong of block 915), an initial cost map may be determined (block 920). The initial cost map may be adjusted to account for moving objects (block 925). One such adjustment may realize guard-band boundaries (e.g., see FIG. 3). The cost map may be further adjusted to bias seam selection to a vertical trajectory within the overlap region as discussed in accordance with FIGS. 7 and 8 (block 930). Based on the final cost map a minimum cost seam can be determined that may, or may not, incorporate seam continuity constraints as described above in accordance with EQS. 2 and 3 (block 935). The two images may then be blended together by blending ±'p' overlapping pixels across the identified minimum cost seam (block 940). While the precise guard-band width chosen is, of course, a design decision subject to the constraints and capabilities of the particular implementation, in one embodiment p maybe 32 to 64 pixels. It is of particular note that acts in accordance with block 940 do not need to use gradients making operation 900 amendable to real-time operations. It should be further noted that operation 900 identifies and compensates for moving objects within the overlap region while also selecting that seam that beneficially maintains the presentation of straight lines (edges) in the final output image. With blending operations complete, the blended image may be stored or displayed (block 945). If all desired images have been registered and blended (the "YES" prong of block 950), operation 900 is complete. If additional images remain to be combined (the "NO" prong of block 950), operation 900 continues at block 905 where the next image to be combined may be obtained.

Returning now to block 915, if the registration metric indicates the registration does not meet an acceptable threshold (the "NO" prong of block 915), sensor output may be obtained (block 955) and used to identify an overlap region between the images (block 960). By way of example, accelerometer and/or gyroscopic sensors associated with the image capture device may be used to estimate the amount of overlap between the images. Once this is done, the two images may be combined by being blended across the sensor-identified overlap region (block 965), where after operation 900 continues at block 945. In one embodiment, guard-band operations may not be employed (e.g., in accordance with block 925). In another embodiment, seam continuity constraints may not be applied (e.g., in accordance with block 935). In still another embodiment, the described bias seam-cut approach may not be implemented (e.g., in accordance with block 930).

In another embodiment, an "image seam-matching" technique as disclosed here may be used to blend two images across a seam's transition band. Image seam-matching can provide many of the benefits of gradient blending without the associated computational overhead (e.g., avoidance of ghosting artifacts). This makes image seam-matching a particularly useful approach for real-time image processing in electronic devices that do not have the computational resources to perform real-time gradient blending operations.

In general, image seam-matching seeks to make the pixel values in the two images being blended the same along their transition border (e.g., seam 815) and smoothly increases/decreases pixel values on either side of the seam through the transition band. Because image seam-matching does not combine information from both images at any pixel, ghosting artifacts may be avoided.

Figure 10:
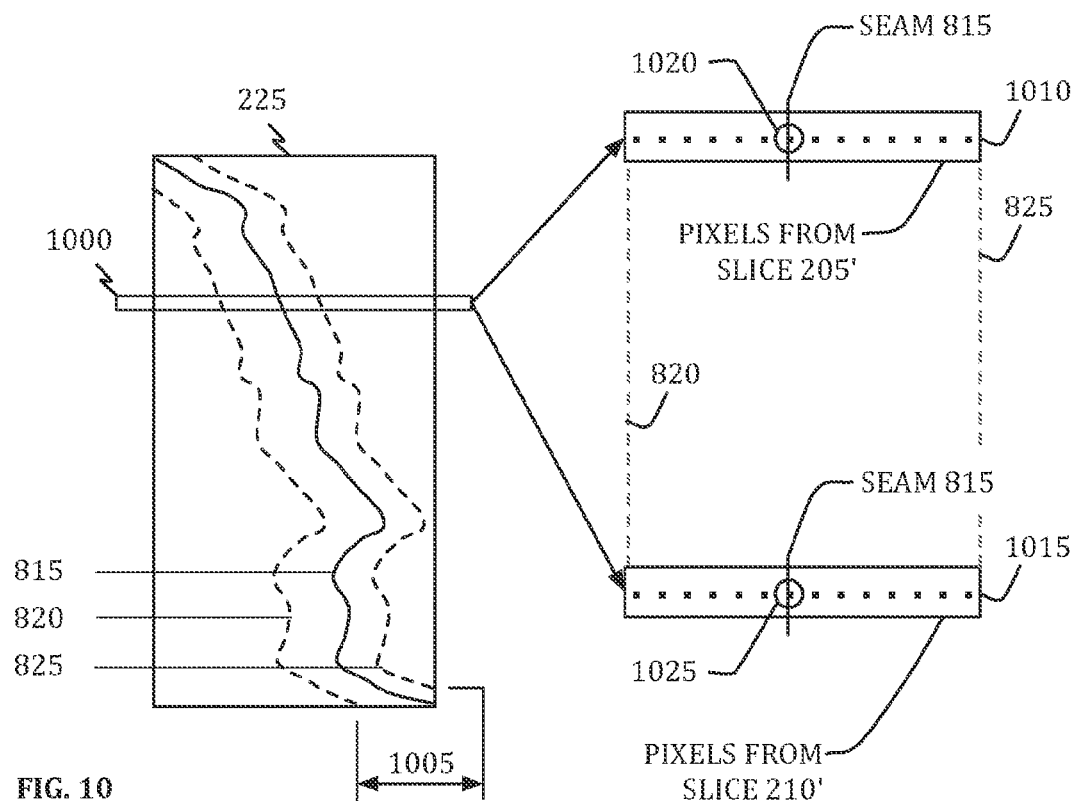
FIG. 10 shows an expanded view of an blend operation's overlap region in accordance with one embodiment.

Referring to FIG. 10, it will be understood that row 1000 in overlap region 225 having seam or transition boundary 815 and transition band 1005 (defined by guard-band boundaries 820 and 825), actually represents the combination of two rows of pixels: pixel row 1010 whose values come from image slice 205' and pixel row 1015 whose pixel values come from image slice 210'. Consider, for example, pixel 1020 from row 1010 and its corresponding pixel 1025 from row 1015. Because pixels 1020 and 1025 lie on seam 815, image seam-matching may adjust their values so that they are equal. In one embodiment, the final or output pixel value corresponding to pixels 1020 and 1025 can be the average of the two pixel values 1020 and 1025. In another embodiment, the final value can be the maximum of the two pixel values.

By way of example (and not to limit the breadth of this disclosure), let pixel 1020's value be $V_L$ (e.g., 50) and pixel 1025's value be $V_R$ (e.g., 200). Using an averaging operator, the value of the output pixel corresponding to pixels 1020 and 1025 may have a value of $V_{seam}$ (e.g., 125, the average of $V_L$ and $V_R$). To achieve this without introducing visual artifacts in the final image, the pixels in row 1000 from each image within transition band 1005 (i.e., pixel row 1010 from image slice 205' and pixel row 1015 from image slice 210'), may be smoothly adjusted so as to just equal $V_{seam}$ (e.g., 125) at seam 815. For the example begun above, left image pixels may be smoothly increased when approaching seam 815 from guard-band boundary 820, and right image pixels smoothly decreased when approaching seam 815 from guard-band boundary 825.

In one embodiment, the increase in pixel values for left image slice 205' (i.e., pixels in row 1010) may be accomplished by adding a linear function that increases from 0 to a value $V_1$, where $V_1$ is a value that when added to $V_L$, equals $V_{seam}$ (e.g., 75). Thus, for left image slice 205', a left image pixel that is at a distance 'd' from seam 815 may have its value increased by:

$$V_1 \frac{(D-d)}{D}, \qquad \text{EQ. 6}$$

where 'D' represents half the width of transition band 1005, and d and $V_1$ are as defined above. In this manner, the value of a pixel from left image slice 205' that is exactly on seam 815 (i.e., d =0) will become $V_{seam}$ ($V_1+V_L=V_{seam}$; 75+50=125). Similarly, the pixels in row 1015 from right image slice 210' may be smoothly decreased in the same way such that, at seam 815 the value of pixel $V_L$, will become $V_{seam}$ (e.g., 125). It should be noted that the linear function identified in EQ. 6 is merely illustrative. In general, any function may be used (linear or non-linear) so long as it evaluates to zero at d=D and $V_1$ at d=0. It is further noted that whether the selected function increases when moving from guard-band boundary 820 toward the seam (as discussed here), or whether it decreases depends on the value of the seam pixel ($V_{seam}$) compared to the from selected image's pixel value (e.g., pixel 1020).

Figure 11:
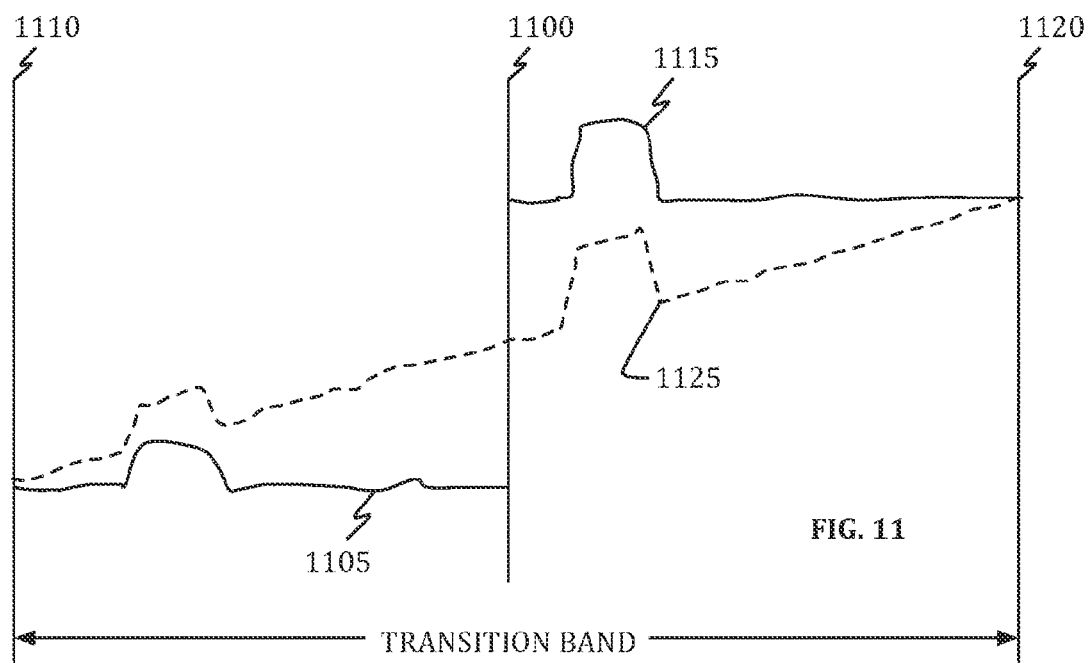
FIG. 11 shows an application of an image seam-matching operation in accordance with one embodiment.

An illustration of this approach may be seen in FIG. 11 where image seam-matching has been applied to a one-dimensional image line that crosses seam 1100. As shown, left image pixel values 1105 are bounded on the left by guard-band boundary 1110 and on the right by seam 1100. Right image pixel values 1115 are bounded on the right by guard-band boundary 1120 and on the left by seam 1100. Line 1125 represents the output pixel values after image seam-matching has been applied to 1105 and 1115. It should be noted that on either side of seam 1100 the two images' pixel values are not combined; rather they are smoothly faded higher (for left image pixels 1105) or lower (for right image pixels 1115).

Figure 12:
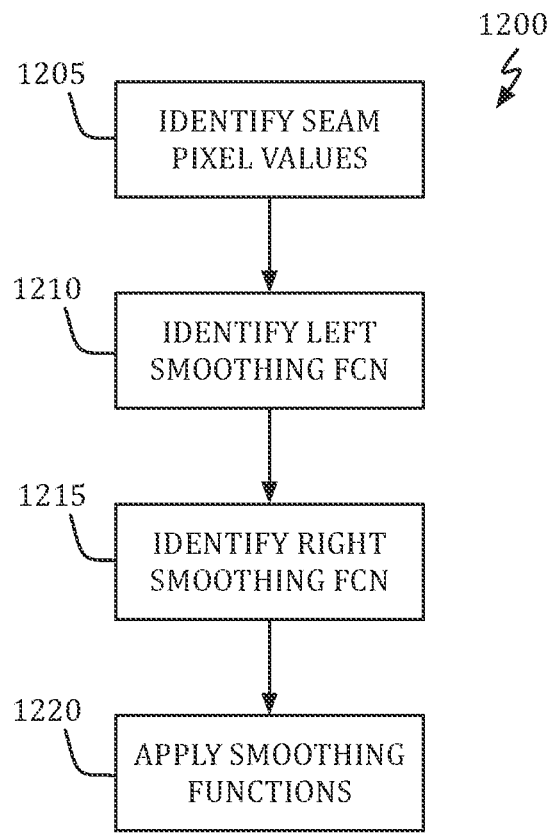
FIG. 12 shows, in flowchart form, an image seam-matching operation in accordance with another embodiment.

To summarize, FIG. 12 shows image seam-matching operation 1200 in accordance with one embodiment and as disclosed herein. To begin, seam pixel values may be determined (block 1205). The precise functional combination used (e.g., average, maximum, minimum) is a matter of design choice for the developer. A smoothing function for each row of the blend operation's left image may be identified (block 1210). Such functions, one example of which is shown in EQ. 6, should smoothly alter left image pixels as each row is processed from the blend operation's left guard-band boundary toward the seam. Similar functions may be found for the blend operation's right image (block 1215). This time, however, the chosen function should smoothly alter the right image pixels from the blend operation's right guard-band boundary toward the seam. The identified smoothing functions may be applied to their corresponding image pixels to generate a composite or output image (block 1220).

Figure 13:
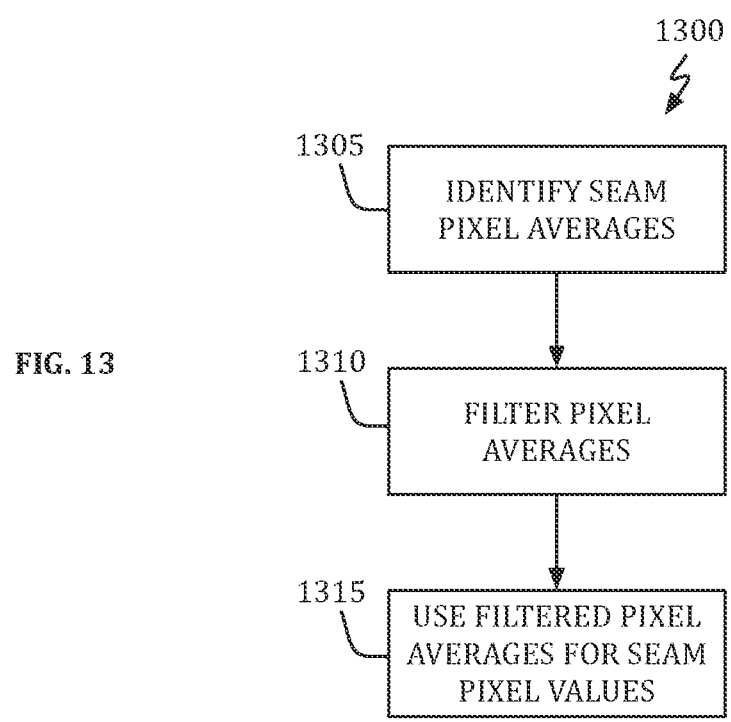
FIG. 13 shows, in flowchart form, a seam pixel pre-filter operation in accordance with one embodiment.

It has been found that noise can cause the difference between two adjacent seam pixels to vary widely from pixel-pair to pixel-pair. These fluctuations may generate unwanted visual artifacts in the final output image. To avoid this problem, seam pixels may be filtered before being used, e.g., by a finite-impulse response (FIR) filter. Referring to FIG. 13, illustrative seam pixel pre-filter operation 1300 identifies the average for each pair of seam pixels (block 1305); that is, the average of a pixel from the left image slice and the corresponding pixel from the right image slice on the seam (see FIG. 10). In one embodiment these values may be kept in an array; one entry for each seam pixel, where the value of each entry is the average of the corresponding seam pixels from the two images being blended. The values so obtained may be filtered to reduce their pixel-to-pixel deviations (block 1310). In one embodiment, the collection of seam pixel average values may be filtered with a Gaussian filter. The filtered average seam pixel values may then be used as the seam pixel values in an image seam-matching operation. That is, output from acts in accordance with block 1315 may be used as input to acts in accordance with block 1205 of FIG. 12.

In situations where there is a long object that crosses the entire overlap area, there will be no possibility of finding a seam that can avoid cutting such an object. If the two parts of the object are perfectly registered (one in the left image and one in the right image), the difference between their pixel values along the seam should be small and the application of image seam-matching techniques in accordance with this disclosure is appropriate. If the two parts of the object are not correctly registered, there can be some pixel locations along the seam where the difference between the left image's pixel value and the right image's pixel value is large. In such cases, image cross-fading may yield a better result because it can mask large differences due to misalignment. Thus, if the absolute values of the difference between pixel values from the left and right images along the seam are small, image seam-matching is an appropriate technique to blend the two images. If, on the other hand, the absolute values of the difference between pixel values from the left and right images along the seam are large, image cross-fading may yield better results.

Rather than selecting one or the other approach (seam-matching or cross-fading), it has been found that a smooth transition between the two can result in a final image having fewer unwanted artifacts. In one embodiment, this may be provided by assigning a weight 'a' to the use of image cross-fading, and a weight (1−α) to the use of image seam-matching, where α∋[0, 1]. If α=1, only image cross-fading techniques may be used. If α=0, only image seam-matching may be used. For any other value of α, a weighted combination of pixel values in accordance with cross-fading and seam-matching approaches may be applied.

Figure 14:
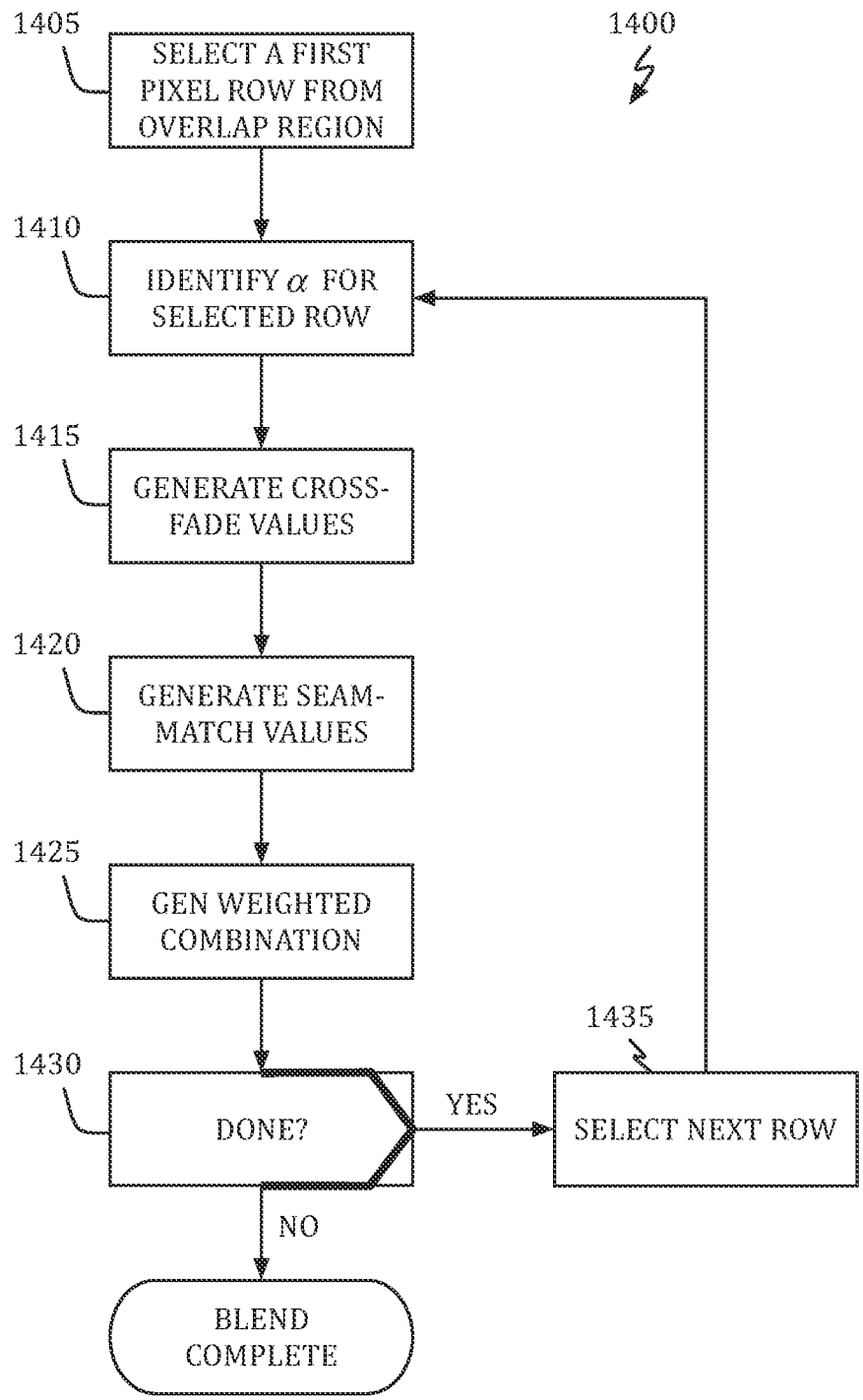
FIG. 14 shows, in flowchart form, an adaptive blend operation in accordance with one embodiment.

Referring to FIG. 14, adaptive image blend operation 1400 in accordance with one embodiment begins by selecting a first row of pixels in an overlap region's transition band (block 1405). A value for weighting parameter a may be chosen (block 1410), where after cross-fade and seam-match values for each pixel in the selected row are determined (blocks 1415 and 1420). Using weighting parameter α, a weighted sum of the cross-fade and seam-match values for each pixel in the selected row may be determined (block 1425). In one embodiment, the weighted sum of pixels within the selected row may be expressed as follows:

$$P_{out}=\alpha P_{cf}+(1-\alpha)P_{sm}, \quad \text{EQ. 7}$$

where $P_{out}$ represents the final or output pixel value, $P_{cf}$ represents the pixel's cross-fade value, $P_{sm}$ represents the pixel's seam-match value, and α is as described above. Applying EQ. 7 to each pixel results in pixel values for the output image's corresponding pixel row. Once the currently selected row has been processed, a check may be made to determine if additional rows in the overlap region have yet to be processed (block 1430). If at least one row remains to be processed (the "YES" prong of block 1430), a next row is selected (block 1435), where after operation 1400 continues at block 1410. If all rows in the overlap region have been processed (the "NO" prong of block 1430), the overlap region's blend operation is complete.

In one embodiment, weighting factor α may be determined for each pixel row in an overlap region. For example, a value for a may be based on the absolute difference between the pixels in the left and right image at the seam, normalized so that α is between 0 and 1. In another embodiment, α values may be collected (e.g., into an array—one entry for each pixel row in an overlap region) and pre-filtered in a manner like that described above with respect to FIG. 13. Similarly, acts in accordance with block 1415 may pre-filter seam pixel values as described above with respect to FIG. 13.

Figure 15:
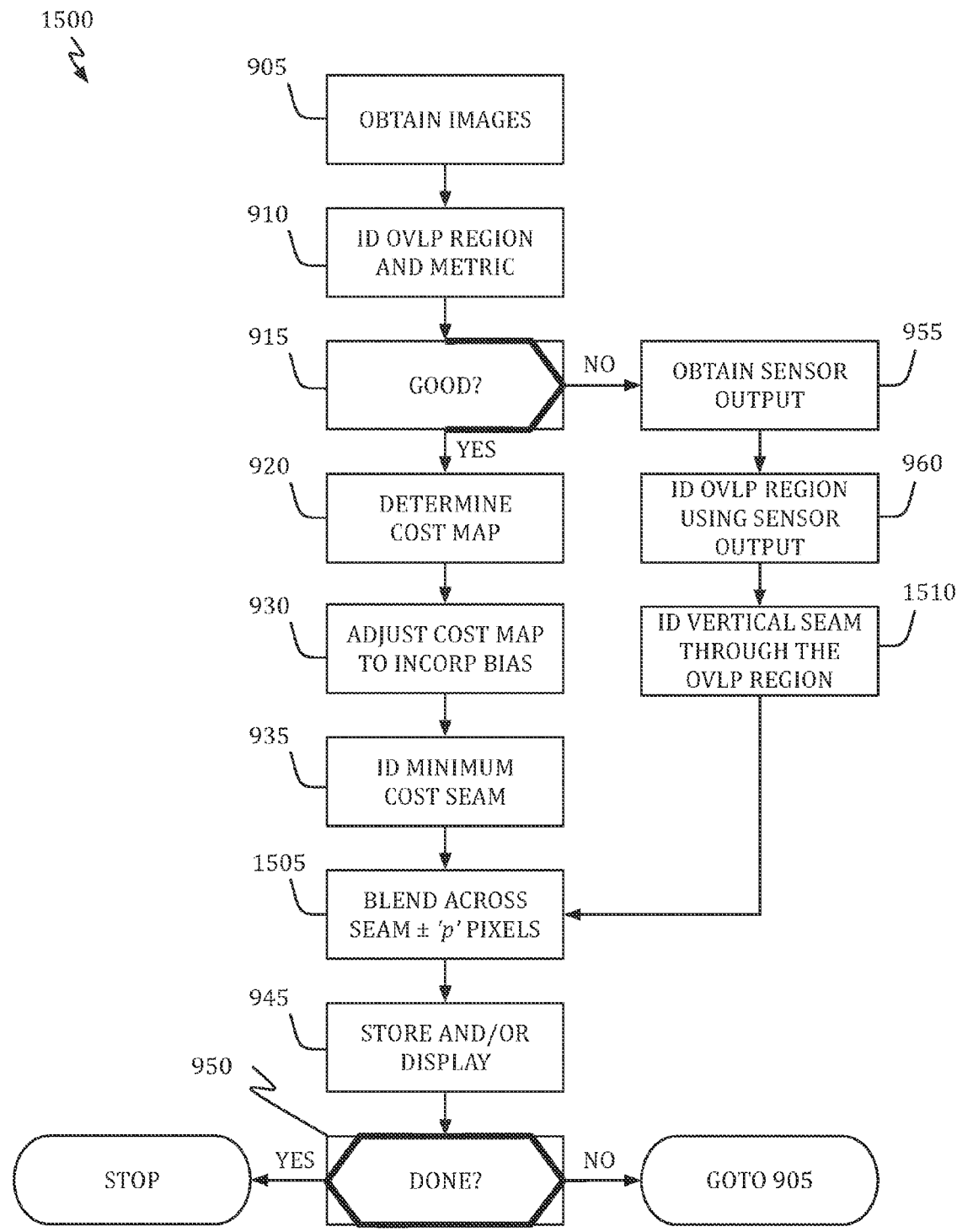
FIG. 15 shows, in flowchart form, a blend operation in accordance with still another embodiment.

Referring now to FIG. 15, operation 1500 proceeds in large part in the same way as did registration and blending operation 900 (see FIG. 9). One significant difference is that adjustment of the cost map to account for moving objects (e.g., using filter function g(z) 315 during acts in accordance with block 925) is not needed when using the seam-matching approach. This difference may provide a significant operational improvement as the evaluation of filter function g(z) 315 can be a computationally time-consuming operation. In addition, blend operation 1505 may now use seam-matching and cross-fading techniques (compare this to actions in accordance with block 940 in FIG. 9). Finally, when visual-based registration fails (the "NO" prong of block 955), once sensor data is used to align the images (block 960), a vertical seam may be identified through the middle of the overlap region (block 1510), where after operation 1500 continues at block 1505. (Compare this to actions in accordance with block 965 in FIG. 9.)

Figure 16:
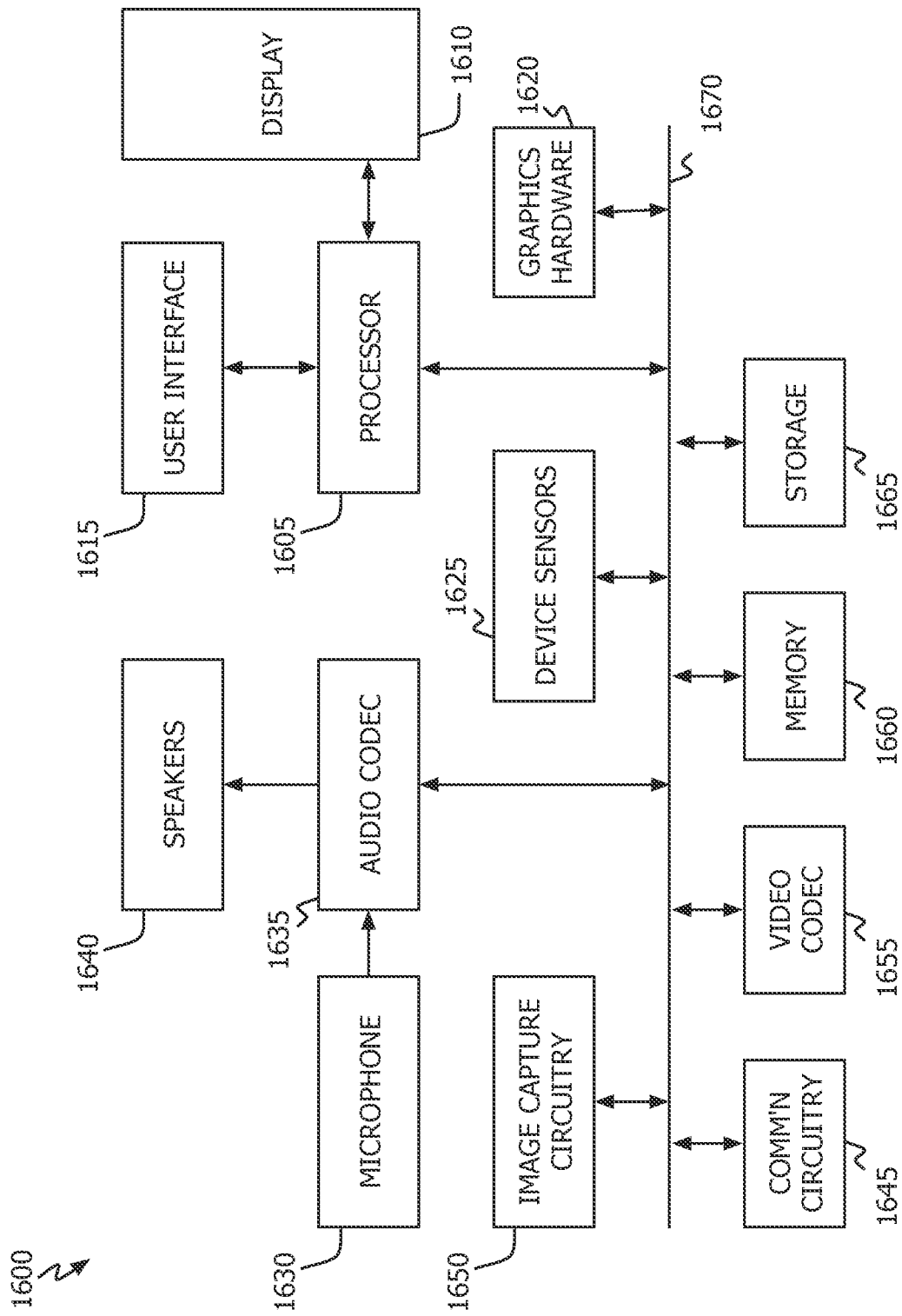
FIG. 16 shows, in block diagram form, an illustrative electronic device that may implement one or more of the described image blending operations.

Referring to FIG. 16, a simplified functional block diagram of an illustrative electronic device 1600 is shown according to one embodiment. Electronic device 1600 may include processor 1605, display 1610, user interface 1615, graphics hardware 1620, device sensors 1625 (e.g., proximity sensor/ambient light sensor, accelerometer and/or gyroscope), microphone 1630, audio codec(s) 1635, speaker(s) 1640, communications circuitry 1645, digital image capture unit 1650, video codec(s) 1655, memory 1660, storage 1665, and communications bus 1670. Electronic device 1600 may be, for example, a personal digital assistant (PDA), personal music player, mobile telephone, or a notebook, laptop or tablet computer system.

Processor 1605 may execute instructions necessary to carry out or control the operation of many functions performed by device 1600 (e.g., such as the generation and/or processing of images in accordance with operations in any one or more of FIGS. 2-9). Processor 1605 may, for instance, drive display 1610 and receive user input from user interface 1615 which can take a variety of forms, such as a button, keypad, dial, a click wheel, keyboard, display screen and/or a touch screen. Processor 1605 may be a system-on-chip such as those found in mobile devices and include a dedicated graphics processing unit (GPU). Processor 1605 may be based on reduced instruction-set computer (RISC) or complex instruction-set computer (CISC) architectures or any other suitable architecture and may include one or more processing cores. Graphics hardware 1620 may be special purpose computational hardware for processing graphics and/or assisting processor 1605 process graphics information. In one embodiment, graphics hardware 1620 may include a programmable graphics processing unit (GPU).

Sensor and camera circuitry 1650 may capture still and video images that may be processed to generate wide angle-of-view images, at least in part, by video codec(s) 1655 and/or processor 1605 and/or graphics hardware 1620, and/or a dedicated image processing unit incorporated within circuitry 1650. Images so captured may be stored in memory 1660 and/or storage 1665. Memory 1660 may include one or more different types of media used by processor 1605, graphics hardware 1620, and image capture circuitry 1650 to perform device functions. For example, memory 1660 may include memory cache, read-only memory (ROM), and/or random access memory (RAM). Storage 1665 may store media (e.g., audio, image and video files), computer program instructions or software, preference information, device profile information, and any other suitable data. Storage 1665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1660 and storage 1665 may be used to retain computer program instructions or code organized into one or more modules and written in any desired computer programming language. When executed by, for example, processor 1605 such computer program code may implement one or more of the methods described herein.

It will also be recognized that operations in accordance with blocks 1415 and 1420 may be performed in any order. It should also be recognized that the identification of blending operation weight factor α may be made after either of the acts identified in blocks 1415 and 1420.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified in FIGS. 9 and 13-14 may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
   obtain an overlap region between a left image and a right image, wherein the overlap region comprises a plurality of rows, each row having a plurality of pixels, each overlap region pixel having a corresponding pixel in the left image and a corresponding pixel in the right image, each pixel in the left and right images having a value;
   identify a seam through the overlap region, the seam comprising a plurality of overlap region pixels, each overlap region pixel from a different row in the overlap region, wherein the seam divides each row in the overlap region into a left portion bounded by a left transition band boundary pixel on one end and the seam pixel on the other end and a right portion bounded by the seam pixel on one end and a right transition band boundary pixel on the other end;
   determine a value for each seam pixel based on a combination of each seam pixel's corresponding left and right image pixels;
   identify a left smoothing function for each row in the overlap region, each left smoothing function having a zero value at the row's left transition band boundary pixel and another value at the row's seam pixel, the value of which is based on a combination of the row's left transition band boundary pixel's value and the row's seam pixel value;
   identify a right smoothing function for each row in the overlap region, each right smoothing function having a zero value at the row's right transition band boundary pixel and another value at the row's seam pixel, the value of which is based on a combination of the row's right transition band boundary pixel's value and the row's seam pixel value;
   apply, for each row in the overlap region, the corresponding left smoothing function to those pixels in the left image corresponding to the overlap region's row's left portion to generate corresponding left portion blended output image pixels;
   apply, for each row in the overlap region, the corresponding right smoothing function to those pixels in the right image corresponding to the overlap region's row's right portion to generate corresponding right portion blended output image pixels; and
   store the blended output image pixels in a memory.

2. The non-transitory program storage device of claim 1, wherein the instructions to cause the processor to determine a value for each seam pixel comprise instructions to cause the processor to:
   determine a preliminary value for each seam pixel based, at least in part, on the values of the seam pixel's corresponding pixels from the left and right images; and
   filter each preliminary seam pixel value to generate a seam pixel value.

3. The non-transitory program storage device of claim 2, wherein the instructions to cause the processor to determine a preliminary value for each seam pixel comprise instructions to cause the processor to determine an average of each seam pixel's corresponding left and right image pixel values.

4. The non-transitory program storage device of claim 1, further comprising instructions to cause the processor to display the blended output pixels on a display element.

5. The non-transitory program storage device of claim 1, wherein the instructions to obtain an overlap region further comprise instructions to determine a registration quality metric.

6. The non-transitory program storage device of claim 5, further comprising instructions to, when the registration quality metric is less than a threshold value:
   obtain output from a motion sensor; and
   obtain an overlap region based on the motion sensor output.

7. The non-transitory program storage device of claim 6, wherein the motion sensor output corresponds to motion that occurred at a time the left and right images were captured.

8. The non-transitory program storage device of claim 6, wherein the motion sensor comprises one of an accelerometer and a gyroscope.

9. The non-transitory program storage device of claim 6, wherein the left and right smoothing function and the right smoothing functions are different smoothing functions.

10. A hand-held electronic device, comprising:
    an image capture element;
    a memory operatively coupled to the image capture element and having stored therein, computer program code;
    a display element operatively coupled to the memory; and
    one or more processors operatively coupled to the memory and the display element and configured to execute the computer program code to—
      use the image capture element to acquire first and second images,
      store the first and second images in the memory,
      determine an overlap region between the first and second images, wherein the overlap region comprises a plurality of rows, each row having a plurality of pixels, each overlap region pixel having a corresponding pixel in the first image and a corresponding pixel in the second image, each pixel in the first and second images having a value,
      identify a seam through the overlap region, the seam comprising a plurality of overlap region pixels, each overlap region pixel from a different row in the overlap region, wherein the seam divides each row in the overlap region into a left portion bounded by a left transition band boundary pixel on one end and the seam pixel on the other end, and a second portion bounded by a right transition band boundary pixel on one end and the seam pixel on the other end,
      determine a value for each seam pixel based on a combination of each seam pixel's corresponding first and second image pixels,
      identify a left smoothing function for each row in the overlap region, each left smoothing function having a zero value at the row's left transition band boundary pixel and another value at the row's seam pixel based on a combination of the row's left transition band boundary pixel's value and the row's seam pixel value, identify a right smoothing function for each row in the overlap region, each right smoothing function having a zero value at the row's right transition band boundary pixel and another value at the row's seam pixel based on a combination of the row's right transition band boundary pixel's value and the row's seam pixel value, apply, for each row in the overlap region, the corresponding left smoothing function to those pixels in the first image corresponding to the overlap region's row's left portion to generate corresponding left portion blended output image pixels, apply, for each row in the overlap region, the corresponding right smoothing function to those pixels in the second image corresponding to the overlap region's row's right portion to generate corresponding right portion blended output image pixels, and store the blended output image pixels in the memory.

11. The hand-held electronic device of claim 10, further comprising instructions to cause the one or more processors to display the blended output image pixels on the display element.

12. The hand-held electronic device of claim 10, wherein the instructions to obtain an overlap region further comprise instructions to determine a registration quality metric.

13. The hand-held electronic device of claim 12, further comprising instructions to cause the one or more processors to, when the registration quality metric is less than a threshold value:

obtain, concurrently with capture of the first and second images, output from a motion sensor of the hand-held electronic device; and obtain an overlap region based on the motion sensor output.

14. The hand-held electronic device of claim 13, wherein the motion sensor comprises one of an accelerometer and a gyroscope.

15. A method to stitch multiple images into a single image, comprising:

obtaining an overlap region between a left image and a right image, wherein the overlap region comprises a plurality of rows, each row having a plurality of pixels, each overlap region pixel having a corresponding pixel in the left image and a corresponding pixel in the right image, each pixel in the left and right images having a value;

identifying a seam through the overlap region, the seam comprising a plurality of overlap region pixels, each overlap region pixel from a different row in the overlap region, wherein the seam divides each row in the overlap region into a left portion bounded by a left transition band boundary pixel on one end and the seam pixel on the other end and a right portion bounded by a right transition band boundary pixel on one end and the seam pixel on the other end;

determining a value for each seam pixel based on a combination of each seam pixel's corresponding left and right image pixels;

identifying a left smoothing function for each row in the overlap region, each left smoothing function having a zero value at the row's left transition band boundary pixel and another value at the row's seam pixel based on a combination of the row's left transition band boundary pixel's value and the row's seam pixel value;

identifying a right smoothing function for each row in the overlap region, each right smoothing function having a zero value at the row's right transition band boundary pixel and another value at the row's seam pixel based on a combination of the row's right transition band boundary pixel's value and the row's seam pixel value;

applying, for each row in the overlap region, the corresponding left smoothing function to those pixels in the left image corresponding to the overlap region's row's left portion to generate corresponding left portion blended output image pixels;

applying, for each row in the overlap region, the corresponding right smoothing function to those pixels in the right image corresponding to the overlap region's row's right portion to generate corresponding right portion blended output image pixels; and storing the blended output image pixels in a memory.

16. The method of claim 15, further comprising displaying the blended output image pixels.

17. The method of claim 15, wherein determining a value for each seam pixel comprises:

determining a preliminary value for each seam pixel based, at least in part, on the values of the seam pixel's corresponding pixels from the left and right images; and filtering each preliminary seam pixel value to generate a seam pixel value.

18. The method of claim 15, wherein obtaining an overlap region further comprises determining a registration quality metric.

19. The method of claim 18, further comprising, when the registration quality metric is less than a threshold value:

obtaining output from a motion sensor; and obtaining an overlap region based on the motion sensor output.

20. The method of claim 19, wherein the motion sensor output corresponds to motion that occurred at a time the left and right images were captured.

* * * * *